United States Patent Office 3,436,628
Patented Apr. 1, 1969

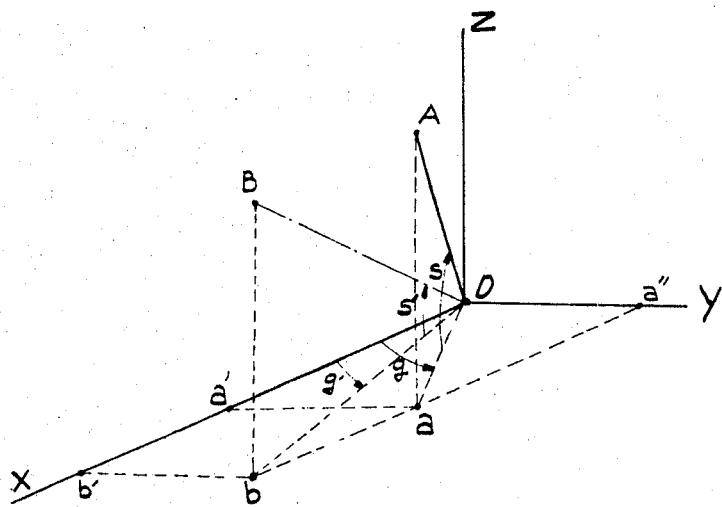
FIG_1
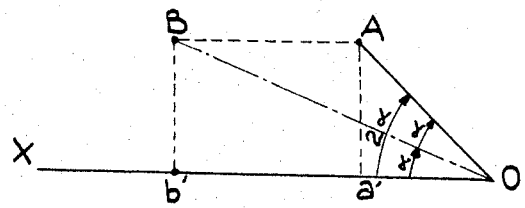
FIG_2
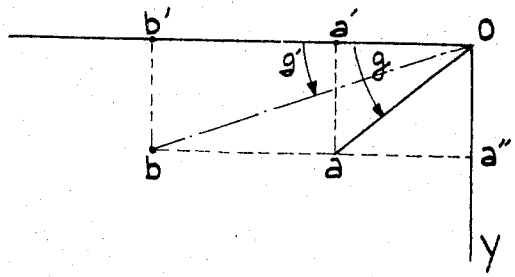
FIG_3

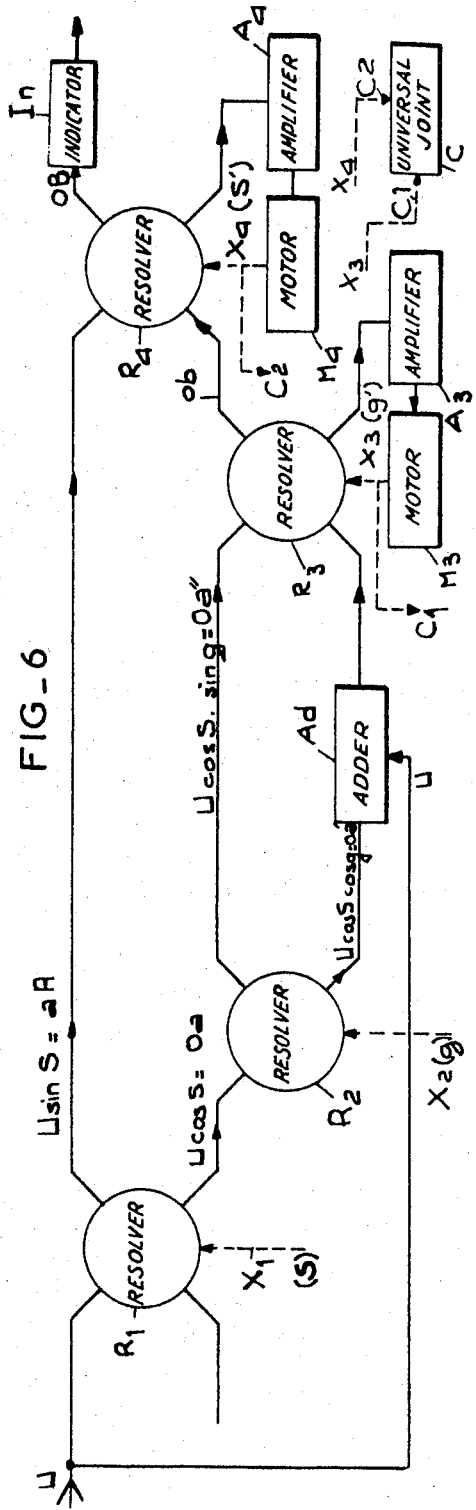
FIG_6
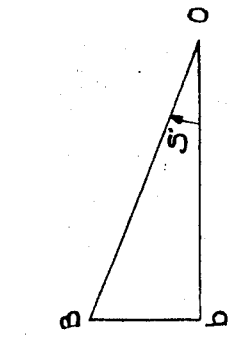
FIG.5
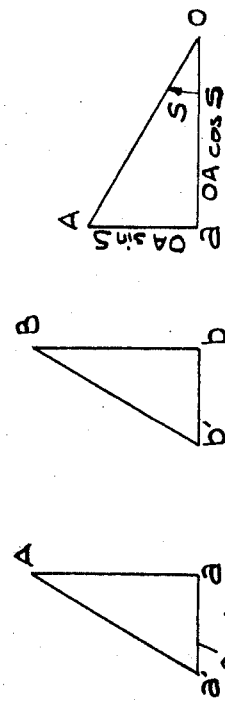
FIG.4

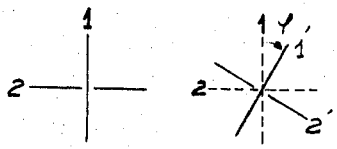
FIG_8
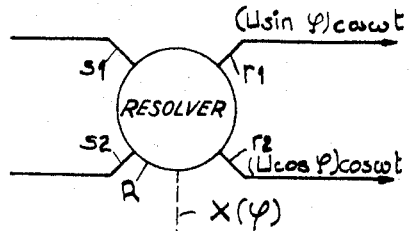
FIG_9
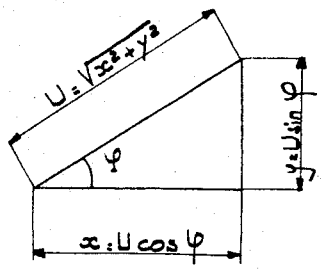
FIG_10
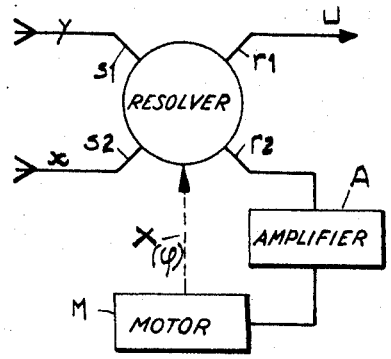
FIG_11
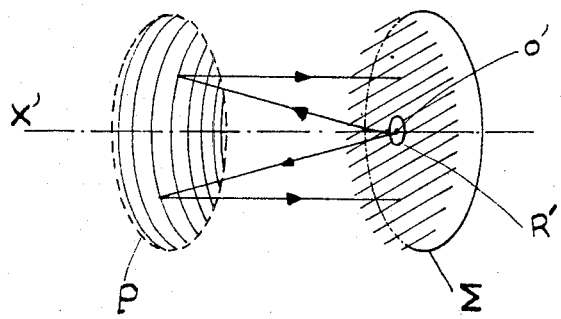
FIG_13

3,436,628
ELECTROMECHANICAL DEVICE FOR CONTROLLING THE DIRECTION OF RADIATION OF A REFLECTOR
Pierre Metz, Paris, France, assignor to CSF—Compagnie Generale de Telegraphie sans Fil, a corporation of France
Filed Aug. 1, 1966, Ser. No. 569,205
Claims priority, application France, Aug. 6, 1965, 27,558
Int. Cl. G05b 11/32
U.S. Cl. 318—18         4 Claims The present invention relates to the controlling of the radiation direction of plane reflectors, orientable relative to an incident wave.

The invention may be applied to all kinds of radiation, and in particular to electromagnetic radiation, for example, for controlling the radiation direction of an antenna with beam deflection by means of an inclinable flat reflector, to optical radiation, for example for stabilizing a laser platform, etc.

It is known that, with fixed direction incident radiation, the direction of the radiation reflected by a plane reflector can be varied by rotating the reflector.

It is an object of the invention to provide a system for correctly positioning in azimuth and elevation a plane reflector as a function of the azimuth and elevation desired for the reflected radiation.

According to the invention there is provided an electromechanical system for controlling the radiation direction of a radiating system comprising a reflector mounted on a universal joint having two rotation axes, namely an elevation angle axis and an azimuth axis, said system comprising: a reference voltage terminal: a first resolver having a radiation elevation angle indicative shaft, a first terminal coupled to said supply terminal, a second and a third terminal: a second resolver having a radiation azimuth indicative shaft, a first terminal coupled to said first resolver second terminal, a second and a third terminal: algebraic adding means having a first input coupled to said second resolver second terminal, a second input and an output; means for applying said reference voltage to said second input; a third resolver having a shaft indicative of the direction of said azimuth axis, a first terminal coupled to said second resolver third terminal, a second terminal coupled to said adding means output, and a third terminal; and a fourth resolver having a shaft indicative of the direction of said elevation angle axis, a first terminal coupled to said first resolver third terminal, a second terminal coupled to said third resolver third terminal and a voltage indicative third terminal.

For a better understanding of the invention, reference will be made to the drawings accompanying the following description in which:

FIGS. 1 to 5 are diagrams showing the trigonometric relations solved by the system according to the invention;

FIG. 6 shows diagrammatically an electromechanical control system according to the invention;

FIGS. 8 to 11 show a detail and the operation thereof;

FIG. 13 shows an antenna array to which the invention may be applied; and

Figure 7:
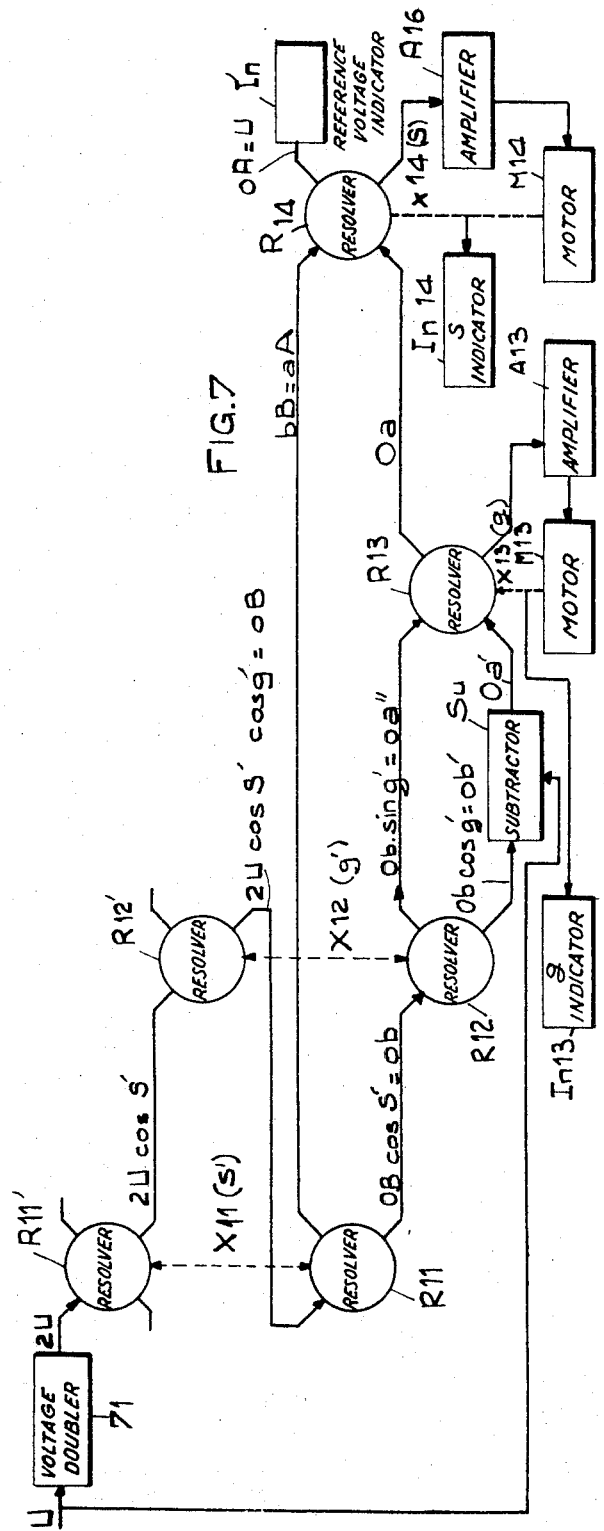
FIG. 7 is a modification.

The reflector considered is assumed to be solid with an axis perpendicular thereto and passing through its center and the angular position of which determines that of the reflector. This axis does not exist physically: the reflector is mounted on a universal joint and the axes of this universal joint are movable, one in elevation and the other in azimuth. For a given radiation direction, these elevation and azimuth are exactly those of this ideal axis.

FIG. 1 shows at OB this ideal axis, at OA the desired radiation direction, and at XO the direction of the incident radiation.

The system according to the invention makes it possible to position OB for given values of the elevation angle and azimuth of the direction OA, measured relative to a trirectangular reference trihedral in which OX is the axis of origin for azimuth measurement. The straight lines OA and OB, which are coplanar with OX, according to the fundamental law of reflection, are not generally comprised in one of the reference planes of the trihedral and are respectively projected at $Oa$ and $Ob$ on the plane XOY. The elevation angle and the azimuth of the desired radiation are defined, respectively, by the angles $$S = \widehat{Oa, OA}$$

and $$g = \widehat{OX, Oa}$$

and those of the axis OB by $$S' = \widehat{Ob, OB}$$

and $$g' = \widehat{OX, Ob}$$

Selecting the points A and B so that AB is parallel to OX, it follows, as shown in FIG. 2, that $OA = OB$, due to the symmetry of the directions of the incident rays OX and the reflected rays OA relative to the normal to the reflector OB, to angle of incidence being $\alpha$. Consequently, the distances $Aa'$ and $Bb'$ from points A and B to OX are equal, and consequently the rectangle triangles $Aa'a$ and $Bb'b$, shown in FIG. 4, are equal and $bB = aA$; $aA = OA \sin S$ and $Oa = OA \cos S$, as may be seen from FIG. 5 (left side) and $\tan S' = bB/Ob$ (right side).

The projections of the points A and B on to the plane XOY, at $a$ and $b$, respectively, are located on a parallel to OX, as shown in FIG. 3 and the azimuth $g'$ is defined by:

$$\tan g' = \frac{bb'}{Ob'} = \frac{aa'}{Oa' + a'b'}$$

One can therefore write, since $aa'$ is equal to $$Oa \sin g = OA. \cos S. \sin g$$

$$\tan g' = \frac{\cos S. \sin g}{\cos S. \cos g + 1} \quad (1)$$

whilst (FIG. 5)

$$\tan S' = \frac{bB}{Ob} = \frac{OA}{OB} \cdot \sin S \quad (2)$$

Since (FIG. 3)

$$\overline{Ob}^2 = \overline{Ob'}^2 + \overline{b'b}^2 = (Oa' + a'b')^2 + (a'a)^2$$

with $Oa' = Oa \cos g = OA \cos S \cos g$.

Dividing by $OA^2$, one obtains:

$$\frac{\overline{Ob}^2}{\overline{OA}^2} = (\cos S. \cos g + 1)^2 + (\sin g. \cos S)^2$$

which gives the relation:

$$\tan S' = \frac{\sin S}{\sqrt{(\cos S. \cos g + 1)^2 + (\sin g. \cos S)^2}} \quad (3)$$

The relations 1 and 3 define completely the elevation S' and the azimuth g' of the axis OB as a function of the elevation S and azimuth g of the desired radiation along an axis OA.

The system according to the invention for controlling the elevation S' and the azimuth g' of the axis of the universal joint supporting the reflector is shown in FIG. 6. It essentially comprises two sine-cosine transformers, for example resolvers $R_1$ and $R_2$, whose respective shafts $X_1$ and $X_2$ display respectively the elevation S and the azimuth g, and two output resolvers $R_3$ and $R_4$, connected to resolvers $R_1$ and $R_2$ in such a way that their respective shafts $X_3$ and $X_4$, respectively, take the position corresponding to the azimuth g' and the elevation S'.

As is known, resolvers comprise two input windings and two output windings: one of the input windings may receive no signal, and under certain conditions the voltage across the terminals of one of the output windings may be zero.

A voltage generator G supplies a reference voltage U, representing OA (FIGS. 1 and 5), which is applied to one of the input windings of the resolver $R_1$, whose shaft is blocked in the angular position corresponding to the elevation S. The cosine output of the resolver $R_1$ is connected to one of the inputs of the resolver $R_2$, whose shaft is blocked in an angular position corresponding to the azimuth g. The sine output of resolver $R_1$ is connected to one input of the resolver $R_4$. The sine output of the resolver $R_2$ is connected to one of the inputs of the resolver $R_3$, whilst its cosine output supplies the first input of an adder $Ad$ whose other input receives the reference voltage. The output of the adder, whose gain must be strictly equal to one, is connected to the second input of resolver $R_3$. The sine output of the latter is connected to the second input of resolver $R_4$. A feedback loop, including a high gain amplifier $A_3$ and a motor $M_3$, whose shaft is coupled to that of the resolver $R_3$, is provided between the second output of the resolver $R_3$ and the shaft of the latter. An identical feedback loop, comprising an amplifier $A_4$ and a motor $M_4$ with shaft $X_4$, is provided between the "cosine" output of the resolver $R_4$ and its shaft $X_4$. The sine output of the resolver $R_4$ may be connected to an indicator $In$. The axes $X_3$ and $X_4$ coincide with the axes $C_1$ and $C_2$ of the universal joint, diagrammatically shown at C or are solid therewith.

The embodiment according to the invention shown in FIG. 7 makes it possible to determine the elevation angle S and the azimuth g of the radiation axis A if the elevation S' and the azimuth g' of the reflector are known.

This embodiment is so to say the reciprocal of that shown in FIG. 6. It comprises essentially a first circuit for elaborating from the reference voltage U which represents OA, a proportional voltage $OB=2OA \cdot \cos \alpha = 2OA \cdot \cos S' \cdot \cos g'$, which values correspond to FIGS. 1 and 2, and a circuit for elaborating S and g, which is absolutely identical to the circuit of FIG. 6. This first circuit comprises a voltage doubler 71, the input of which receives the voltage U. This voltage doubler is connected to one input of a resolver $R'_{11}$, whose shaft $X_{11}$ is positioned to display the elevation angle S' and whose cosine output is connected to the input of a resolver $R'_{12}$ whose shaft $X_{12}$ is positioned to display the azimuth g'.

Shafts $X_{11}$ and $X_{12}$ may be the shafts of the universal joint driving the reflector.

The second circuit comprises a resolver $R_{11}$ with the same shaft as $R'_{11}$ and whose input is connected with the cosine output of the resolver $R'_{12}$, a resolver $R_{12}$ with the same shaft as the resolver $R'_{12}$, whose input is connected with the cosine output of the resolver $R_{11}$, a subtractor $Su$ with two inputs, respectively coupled to the cosine output of the resolver $R_{12}$ and to the reference voltage generator G, and two resolvers $R_{13}$ and $R_{14}$ connected to resolvers $R_{11}$ and $R_{12}$ in the same way as resolvers $R_3$ and $R_4$ were connected to resolvers $R_1$ and $R_2$. Each resolver comprises a shaft, $X_{13}$ or $X_{14}$, and a feedback loop comprising a high gain amplifier, $A_{13}$ or $A_{14}$ and a motor, $M_{13}$ or $M_{14}$ coupled to the axis of the corresponding resolver. When the voltages at the inputs of the amplifiers are cancelled out, the shafts $X_{13}$ and $X_{14}$ are respectively positioned to display angles S and g. By way of example, two indicators $In$ 13 and $In$ 14 are coupled to shafts $X_{13}$ and $X_{14}$ to indicate angles S and g. Of course, such direct indicators may be replaced by any known coordinate transformation system if it is desired to know the direction of the radiation otherwise than by their elevation and azimuth angles.

The voltage at the cosine output of the resolver $R_{14}$ represents OA and must be equal to U. An indicator $In$ connected to this output (for example, a zero indicator having another input connected to the supply U), permits the control of the correct operation of the feedback loop and may provide, if desired, an indication of the order of magnitude of the error caused by the dynamic delays of the same.

Of course the reference voltages may be applied to the resolver $R_{14}$, the control voltage indicator being applied to the resolver $R'_{11}$. Also an adder may be substituted for the substractor $Su$ provided the connection are reversed.

Figure 14:
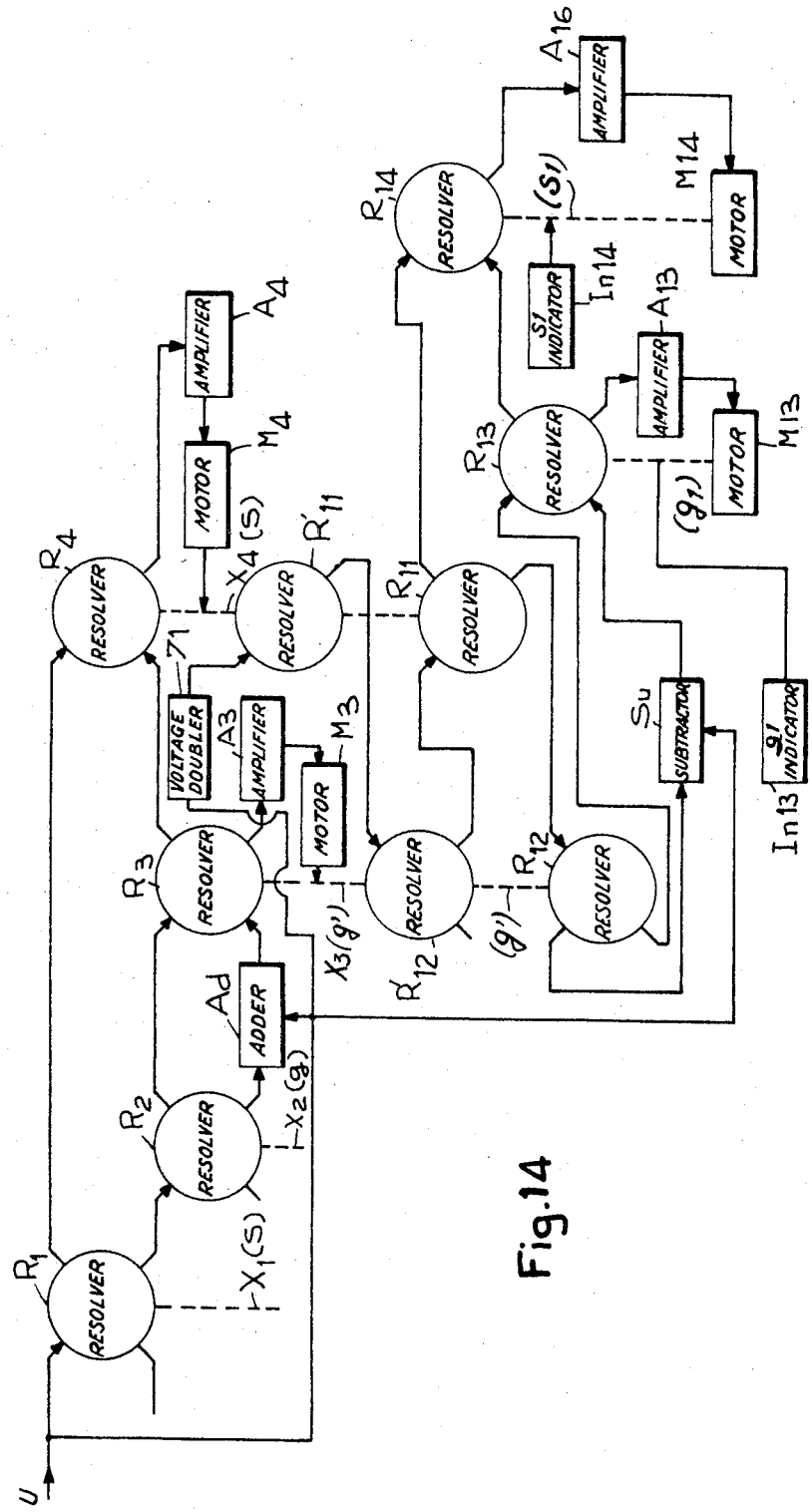
FIG. 14 shows a combination of the systems shown in FIGS. 6 and 7.

The systems of FIGS. 6 and 7 may be combined, as shown in FIG. 14, to indicate, starting from the desired theoretical values of S and g, at every moment, the effective values, i.e., $S_1$ and $g_1$ of the radiation direction. To this end it suffices to juxtapose the systems of FIGS. 6 and 7, using the same reference voltage and mounting the resolvers $R_3$ and $R_4$ on the same shafts as the resolvers $R'_{12}$ and $R'_{11}$, respectively.

The automatic setting of the shafts $X_3$ and $X_4$ to the angular positions corresponding to values g' and S' (FIG. 6) and the shafts $X_{13}$ and $X_{14}$ to the values g and S (FIG. 7) results from the trigonometrical relations set forth above and from the operating principles of rotational sine-cosine transformers, which will be recalled briefly with reference to FIGS. 8 to 11, which relate to a resolver the axes of two fixed, or stator, winding of which are shown in FIG. 8 at 1 and 2 and those of rotor windings forming a variable angle with the former are shown at 1' and 2'. Calling $\varphi$ this variable angle, a voltage U, applied, for example, to the terminal $S_2$ of a stator winding, generates two induced voltages of amplitudes $U \cos \varphi$ and $U \sin \varphi$ at the terminals $2_2$ and $2_1$, of the rotor windings. Of course, in this example the input voltages is an A.C. voltage $U \cos \omega t$ and the induced voltages are $U \cos \varphi \cdot \cos \omega t$ and $U \sin \varphi \cos \omega t$, and the voltage applied to the input of resolver $R_1$, if the same is of this type, is also $U \cos \omega t$. The term $\cos \omega t$, which recurs as a factor in all the above and following formulae, has been disregarded in order to simplify the equation. In addition, there exist rotational sine-cosine transformers, for example of the potentiometer type, operating with a D.C. reference voltage. The equations which follow and the expressions appearing in FIGS. 6 and 7 are thus valid in all cases, provided it is taken into account that, if A.C. voltages are used, they correspond to the peak voltage values.

The decomposition of the amplitude U into $x=U \sin \varphi$ and $y=U \cos \varphi$ is shown in FIGS. 9 and 10 for a resolver R, whose rotor axis X has rotated through an angle $\varphi$ relative to the stator windings.

On the other hand the operation of the resolver is completely reversible, i.e., if one applies the voltages $x=U \cos \varphi$ and $y=U \sin \varphi$ to the stator windings $r_2$ and $r_1$, one can obtain at the stator winding $r_2$ the voltage U, provided that the rotor has been rotated through the angle $\varphi$ relative to the stator. For this reason, it had not been stated in the description of FIGS. 6 and 7 whether the inputs and outputs of the resolvers $R_1$ and $R_4$ are formed by the terminals of the stator or rotor.

However, generally the terminals of the stator are used as input terminals for reasons of precompensation, which are well known in the art and which need not be discussed here. It must be understood that if compensated resolvers are available so that the rotor terminals can be used as input terminals, the connection diagram is identical.

The resolver appears therefore in this particular case as an analogue device which permits to carry out the Pythagorean theorem.

The problem presented by the correct and accurate display of the angle $\varphi$ is solved by the conventional feedback arrangement shown in FIG. 11 and consisting essentially of a high gain amplifier A and a motor M, having a shaft X, placed in series between the terminal $r_2$ and the shaft of the rotor. In fact, in view of the complete reversibility of the resolver, if one applies the voltage $y$ to the terminals $s_1$ and $x$ to the terminals $s_2$, and assuming that there exists an angle $\varphi'$ between the rotor and the stator their exists at the terminals $r_2$ a voltage whose peak amplitude is:

$$x \sin \varphi' - y \cos \varphi' = U (\cos \varphi \sin \varphi' - \sin \varphi \cos \varphi')$$

and at the terminals $r_1$:

$$x \cos \varphi' + y \sin \varphi' = U (\cos \varphi \cos \varphi' + \sin \varphi \sin \varphi')$$

Making $\varphi' = \varphi$, the first voltage becomes zero and the second equal to U.

This result implies obviously a correct connection of the resolver.

The condition $\varphi' = \varphi$ corresponds to a zero voltage at the terminals $r_2$ and the shaft of the resolver is controlled considering the winding corresponding to $r_2$ as the source of the error voltage. The shaft X assumes the angular position corresponding to the value $\varphi$ so that $\tan \varphi = y/x$.

By applying all the preceding relations to the circuit of FIG. 6 one finds at the output of the resolver $R_1$ the voltages $U \sin S$ and $U \cos S$, and at the input of the resolver $R_3$ the voltage $U \cos S \sin g$, supplied directly by the resolver $R_2$, and the voltage $U (\cos S. \cos g+1)$ supplied by the output of the adder $Ad$. Owing to the feedback circuit formed by the amplifier $A_3$ and the motor $M_3$, the shaft $X_3$ of resolver $R_3$ takes up an angular position corresponding to angle $\varphi$ such that $$\tan \varphi = \frac{\cos S. \sin g}{1 + \cos S. \cos g}$$

This relation is none other than the above relation 1 i.e., $\varphi$ is equal to $g'$.

The voltage collected at the rotor winding of the resolver $R_3$, not connected to the amplifier $A_3$, is therefore equal to:

$$U\sqrt{(\cos S. \sin g)^2 + (1 + \cos S. \cos g)^2}$$

and since U represents $\overline{OA}$, it represents $\overline{Ob}$ of FIGS. 1, 3 and 5.

Similarly, the rotor of the resolver $R_4$ positions itself at an angle $\varphi$ such that $\tan \varphi = U \sin S/Ob$, which is nothing else than the above relation 3, and $\varphi$ is here equal to $S'$. At the terminal of the ouput of the resolver $R_4$, not connected to the amplifier, one has a potential difference representing the length OB.

The indicator $In$ may be graduated directly in elevation $S'$ and azimuth $g'$, which permits the indication of the effective direction of the radiation. In fact, the servomechanisms $M_3$, $A_3$ and $M_4$, $A_4$ do not cancel immediately the error voltage, and it might be useful to know at each moment the exact direction of radiation. As shown in FIGS. 1 to 5, to the length OB corresponds only one elevation angle value, $S'$, one azimuth value $g'$, and one elevation angle S and one azimuth $g$.

The indicator $In$ may also be calibrated in S and $g$. It is also possible, as known in the art, to use this voltage for improving the two feedback loop actions.

Similarly, by applying the relations of the resolvers to the circuit of FIG. 7, one has at the output of resolver $R'_{12}$ a voltage proportional to OB, at the input of resolver $R_{12}$ a voltage proportional to $Ob$ and thus at the two inputs of resolver $R_{13}$ and at the two inputs of resolver $R_{14}$ voltages proportional, on the one hand, to $\sin g$ and $\cos g$, and on the other hand to $\sin S$ and $\cos S$, which results due to the existence of feedback loops, in the positioning of the shafts $X_{13}$ and $X_{14}$ in angular positions corresponding to $g$ and S.

The shafts $X_1$ and $X_2$ on the one hand, and $X_{11}$ and $X_{12}$ on the other hand, may be positioned to the values S and $g$, or $S'$ and $g'$, either directly (manually) or by means of control voltages which are proportional thereto and derived either from digital data, or in any other known manner.

Figure 12:
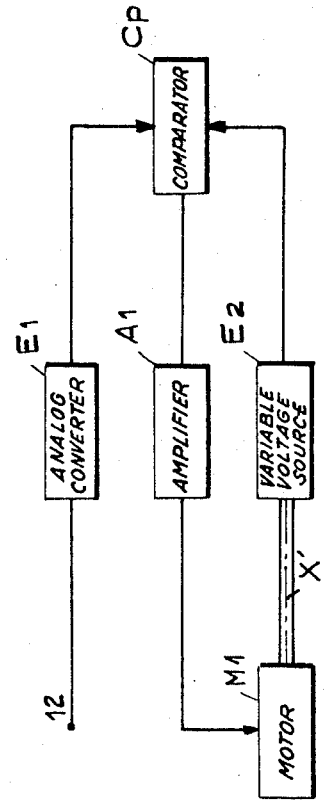
FIG. 12 is an embodiment of the display of the coordinates.

FIG. 12 shows the basic diagram of an indirect control of one of the shafts $X_1$, $X_2$, $X_{11}$ or $X_{12}$. This diagram is entirely conventional and given by way of example.

It comprises essentially an input arrangement $E_1$, an arrangement $E_2$ supplying a signal of the same nature as that supplied by the arrangement $E_1$, and comprising an input shaft $X'$ and a control device for the position of $X'$, formed by a comparator $Cp$ supplied by arrangements $E_1$ and $E_2$, a high gain amplifier $A_1$, connected to the output of the comparator, and a motor $M_1$ supplied by the output of the amplifier and driving the shaft $X'$ which is connected to one of the shafts $X_1$, $X_2$, $X_{11}$ or $X_{12}$ of FIGS. 6 or 7 as the case may be.

For example, arrangement $E_1$ can be a digital analogue converter supplying a voltage proportional to the digital value displayed at the input 11, and arrangement $E_2$ a variable voltage source adjustable by potentiometer with an axis $X'$. The arrangement $Cp$ is then a simple subtractor and values S and/or $g$ may be supplied directly as voltages. Arrangement $E_1$ is then a variable voltage source. Also, arrangements $E_1$ and $E_2$ may be binary computers, the former having a digital input and the latter a rotating input shaft, the arrangement $Cp$ being then a binary calculator followed by binary analogue transformer.

The invention may be used in all cases where the direction of radiation is to be varied and the system comprises a flat reflector.

FIG. 13 shows a double reflector system of the inverted Cassegrain type, which may be in particular used for optical and/or electromagnetic radiation and to which the invention may be applied. This system comprises a primary fixed parabolic reflector P, a mobile secondary reflector $\Sigma$ and a radiation source $R'$ with the centre $O'$, at the focus of the paraboloid. The reflector P reflects on to the reflector $\Sigma$ a radiation with fixed direction $OX'$ parallel to its axis. In the drawing, the reflector $\Sigma$ is perpendicular to the axis $O'X'$, which corresponds to a radiation parallel to $O'X'$. For obtaining a radiation in a direction corresponding to an elevation angle S and an azimuth $g$, the elevation and the azimuth axes of the universal joint, on which the reflector is mounted, are made to coincide with the ares $X_3$ and $X_4$ of FIG. 6, and the directions $O'X'$ and $O'B'$ correspond, respectively, to the direction OX and OB of FIG. 1.

Of course, the invention is not limited to the embodiments hereinbefore described by way of example. In particular, the sine-cosine transformers may be of any type, provided they satisfy the same angular relations as the resolvers.

Similarly, the application of the invention is of course not restricted to the case of a Cassegrain antenna, which is mentioned here only by way of example. It may be applied in particular to any antenna whose beam may be directed by inclining a flat reflector and more generally to all types of radiation, such as, for example, optical radiation; it may also be used advantageously in all problems concerning platform stabilization.

What is claimed is:

1. An electromechanical system for controlling the radiation direction of a radiating system comprising a reflector mounted on a universal joint having two rotation axes, namely an elevation angle axis and an azimuth axis, said system comprising:

a reference voltage terminal;

a first resolver having a radiation elevation angle indicative shaft;

a first terminal coupled to said voltage terminal, a second and a third terminal;

a second resolver having a radiation azimuth indicative shaft, a first terminal coupled to said first resolver second terminal, a second and a third terminal; algebraic adding means having a first input coupled to said second resolver second terminal, a second input and an output;

means for applying said reference voltage to said second input;

a third resolver having a shaft indicative of the direction of said azimuth axis, a first terminal coupled to said second resolver third terminal, a second terminal coupled to said adding means output, and a third terminal; and a fourth resolver having a shaft indicative of the direction of said elevation angle axis, a first terminal coupled to said first resolver third terminal, a second terminal coupled to said third resolver third terminal and a voltage indicative third terminal.

2. A system as claimed in claim 1, wherein said third and fourth resolvers further comprise respective fourth terminals, said system further comprising:

a first and a second amplifier having respective inputs respectively coupled to said fourth terminals of said third and fourth resolvers and respective outputs;

a first and a second motor having respective inputs respectively coupled to the outputs of said amplifiers, and respective shafts respectively coupled to said shafts of said third and fourth resolvers.

3. A system as claimed in claim 1 wherein said first and second resolvers further comprise respective fourth terminals, said system further comprising:

a first and a second amplifier having respective inputs respectively coupled to said fourth terminals, and respective outputs;

a first and a second motor having respective inputs, respectively coupled to said outputs of said amplifiers, and respective shafts coupled respectively to said shafts of said first and second resolvers;

a fifth resolver having a shaft indicative of the direction of said azimuth axis, a first terminal coupled to said fourth resolver third terminal, and a second terminal;

a sixth resolver having a shaft indicative of the direction of said elevation angle axis, a first terminal coupled to said fifth resolver second terminal, and a second terminal; and means for applying to said sixth resolver second terminal a constant voltage equal to twice said reference voltage.

4. A system as claimed in claim 1 wherein said third and fourth resolvers further comprise respective fourth terminals, said system further comprising:

a first and a second amplifier having respective inputs respectively coupled to said fourth terminals of said third and fourth resolvers and respective outputs;

a first and a second motor having respective inputs respectively coupled to the outputs of said amplifiers, and respective shafts respectively coupled to said shafts of said third and fourth resolvers;

a voltage doubler having an input coupled to said reference voltage terminal and an output;

a fifth resolver having a shaft coupled to said fourth resolver shaft, a first terminal coupled to said doubler output and a second terminal;

a sixth resolver having a shaft coupled to said third resolver shaft, a first terminal coupled to said fifth resolver second terminal and a second terminal;

a seventh resolver having a shaft coupled to said fourth and fifth resolver shafts, a first terminal coupled to said sixth resolver second terminal, and a second and a third terminal;

an eighth resolver having a shaft coupled to said third and sixth resolver shafts, a first terminal coupled to said seventh resolver second terminal, and a second and a third terminal;

an algebraic adder having a first input coupled to said eighth resolver second terminal, a second input coupled to said reference voltage terminal, and an output;

a ninth resolver having a radiation direction elevation angle indicative shaft, a first terminal coupled to said eighth resolver third output, a second terminal coupled to said last mentioned adder output, and a third and a fourth terminal;

a tenth resolver having a radiation direction azimuth indicative shaft, a first terminal coupled to said seventh resolver third terminal, a second terminal coupled to said ninth resolver third terminal and a third terminal;

a third and a fourth amplifier having respective inputs respectively coupled to said ninth resolver fourth output and to said tenth resolver third output, and respective outputs;

a third and a fourth motor having respective inputs respectively coupled to said third and fourth amplifier outputs; and respective shafts respectively coupled to said ninth and tenth resolvers.

References Cited

UNITED STATES PATENTS

| 2,598,250 | 5/1952 | Gehman | 318—30 XR |
| 3,353,095 | 11/1967 | Farrand | 318—30 XR |
| 3,371,256 | 2/1968 | Eisengrein et al. | 318—162 XR |
| 3,382,500 | 5/1968 | Mayer | 318—30 XR |

BENJAMIN DOBECK, *Primary Examiner.*